United States Patent
Thurman, Jr.

[15] 3,689,838
[45] Sept. 5, 1972

[54] SEMICONDUCTOR TESTER HAVING VISUAL AND AUDIBLE DISPLAY

[72] Inventor: Milton E. Thurman, Jr., 721 W. 11th St., Newton, Kans. 67114

[22] Filed: June 7, 1971

[21] Appl. No.: 150,368

[52] U.S. Cl...............................324/158 T, 324/73 R
[51] Int. Cl........................G01r 31/22, G01r 15/12
[58] Field of Search ..324/158 T, 158 D, 158 R, 73 R

[56] References Cited

UNITED STATES PATENTS

| | | | |
|---|---|---|---|
| 2,895,106 | 7/1959 | Taunt | 324/158 R |
| 3,579,103 | 5/1971 | Russell | 324/73 R |

*Primary Examiner*—Rudolph V. Rolinec
*Assistant Examiner*—Ernest F. Karlsen
*Attorney*—Buckhorn, Blore, Klarquist and Sparkman

[57] ABSTRACT

A semiconductor tester having a visual display including four information indicator lamps arranged in square with green lamps at adjacent corners and red lamps at the remaining corners and having an amber mode indicator lamp at the center of the square, is provided with a circuit producing an audible signal if the results of tests of the junctions of a bipolar transistor in two different test modes are that the junctions are conductive in the proper direction and are not short circuited, and also producing such audible signal if the results of the test of a diode in a single mode test is that the diode is conductive in one direction only. The information indicator lights provide additional information such as whether a good transistor is PNP or NPN, or that a good diode is improperly marked or improperly installed in the tester. In the case of a bad transistor the indicator lamps indicate the type and location of the fault present in the transistor.

9 Claims, 3 Drawing Figures

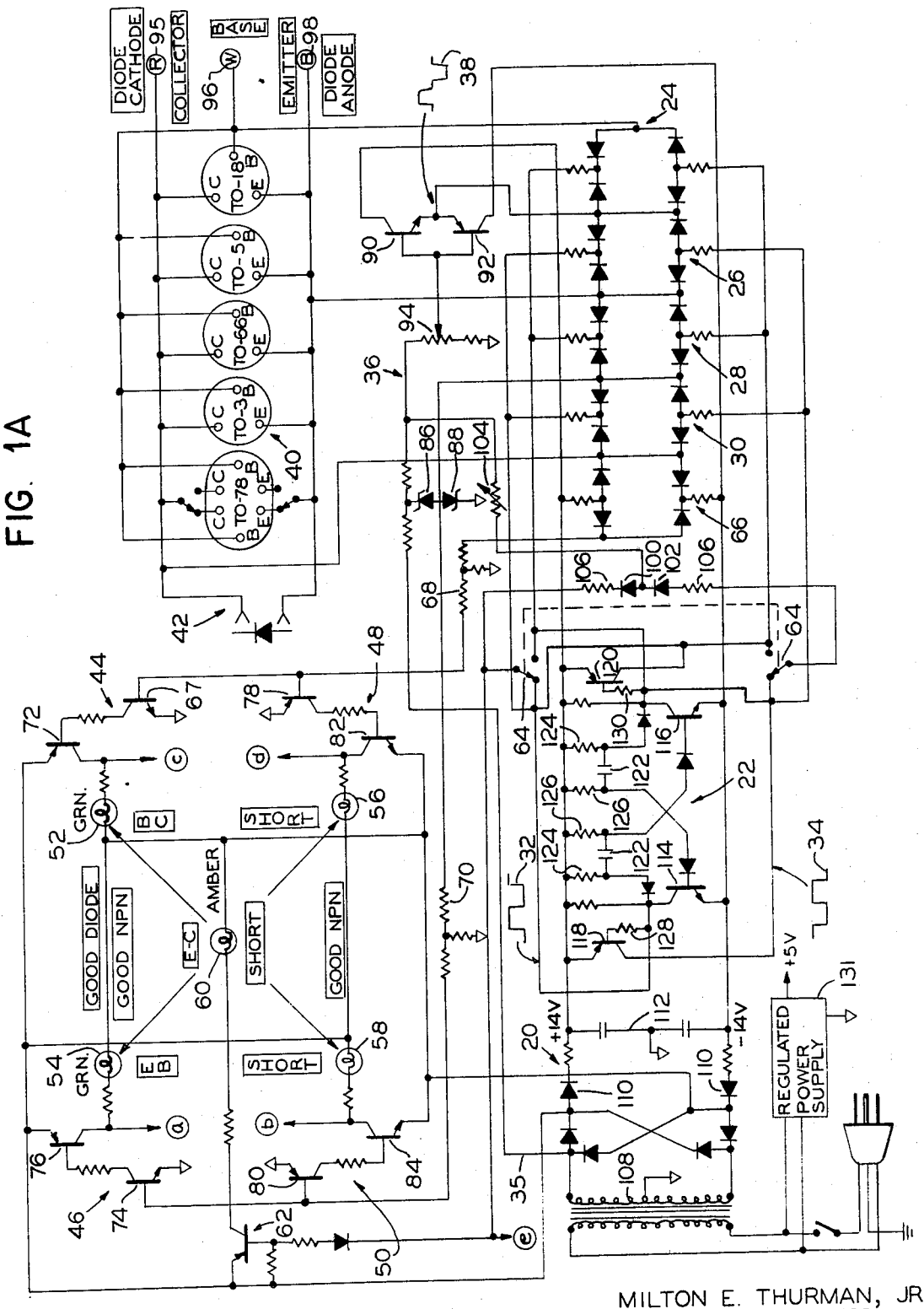

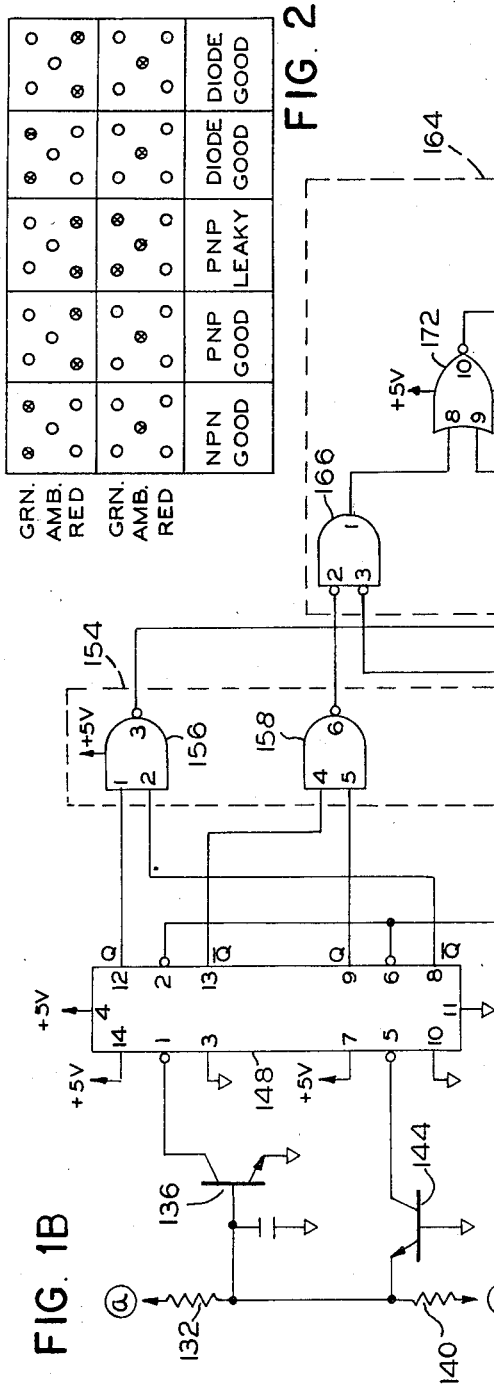
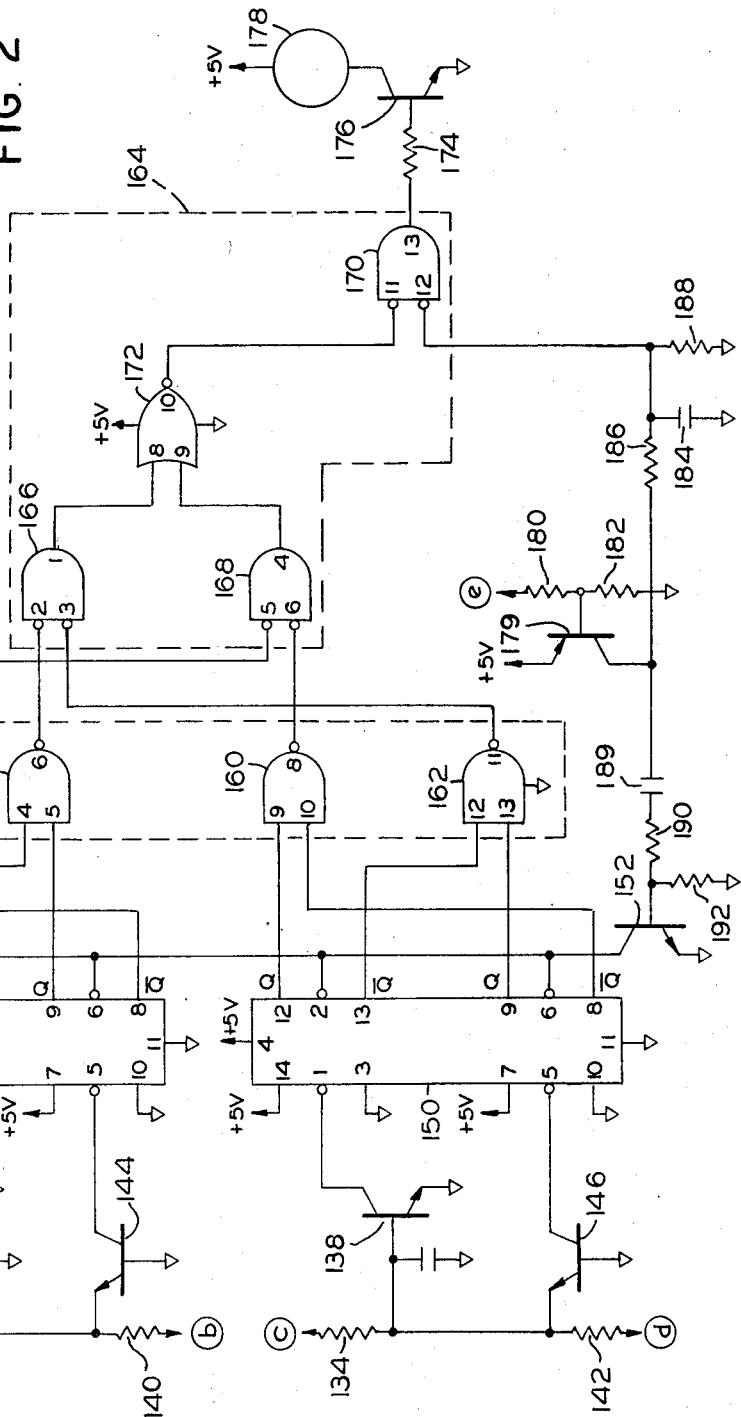

SEMICONDUCTOR TESTER HAVING VISUAL AND AUDIBLE DISPLAY

CROSS REFERENCE TO RELATED APPLICATION

This application relates to an improvement of the semiconductor tester disclosed and claimed in my copending application Ser. No. 792,445, now U.S. Pat. No. 3,601,698, filed Jan. 21, 1969.

BACKGROUND OF THE INVENTION

The semiconductor tester disclosed in my copending application above referred to provides a visual display made up of a plurality of indicator lamps which are lighted in different patterns depending upon the conductive properties of the junctions of a bipolar transistor, or the conductive properties of a diode plugged into a socket or connected by leads to appropriate terminals of the tester. The transistors are automatically tested in two different modes and the information furnished by the visual display indicates whether all of the junctions are conducting in the proper direction and also indicates whether there are short circuits between any two terminals of the transistor as well as indicating whether the transistor is NPN or PNP, if the transistor is at least partly operative, and in the case of a diode whether it is improperly marked or improperly installed in the tester, if the diode is a good diode.

SUMMARY OF THE INVENTION

The tester of the present invention provides an improved circuit which enables bipolar transistors to be tested when connected in a utilization circuit even when relatively low impedances are present between the opposite terminals of either or both junctions, and also enables an improved diode test under similar circuit conditions. The major improvement, however, is the provision of a circuit which will sound an audible signal only in the event that the test of a bipolar transistor in two test modes or the test of a diode show that the component being tested is operative in all respects. In testing such components in circuit, the operator does not need to even look at the test instrument unless he fails to get an audible signal or unless he wishes to know whether the transistor is an NPN or PNP or whether a diode is incorrectly marked. In case he fails to get an audible signal, a display made up of five indicators, for example, electric lamps each having an off or non-lighted condition or an on or lighted condition provides information as the the fault in the device resulting in such failure.

It is therefor an object of the invention to provide an improved semiconductor tester which produces an audible signal in connection with an information display when the tests of such devices show a good semiconductor device.

BRIEF DESCRIPTION OF THE DRAWINGS

FIG. 1A is a schematic diagram of the portion of the circuit of a tester which provides visual indicator display patterns showing the results of tests of semiconductors;

FIG. 1B is a schematic diagram of the portion of such circuit which provides an audible signal when the test results are that the semiconductors are good; and FIG. 2 is a chart illustrating a few of the indicator display patterns.

DESCRIPTION OF A PREFERRED EMBODIMENT

Referring to FIG. 1A, the embodiment of the semiconductor tester shown includes a power supply 20 which supplies direct current power to a free running multivibrator 22 which in turn controls a plurality of electronic switches 24, 26, 28 and 30. The multivibrator 22 provides two output square waveforms 32 and 34 of opposite phase and the connections are such that switches 24 and 28 are conductive when the waveform 32 is at its most positive potential and the waveform 34 at its most negative potential. The switches 26 and 30 are conductive when the waveform 34 is at its most positive potential and the waveform 32 is at its most negative potential, it being understood that the switches 24 and 28 are non conductive when the switches 26 and 30 are conductive and vice versa.

The power supply 20 also furnishes an alternating current voltage through a conductor 35 to a wave shaper 36 which provides a low voltage clipped alternating current output voltage waveform 38 employed as a test or interrogation voltage. The switches 24 and 30 inclusive control the application of the voltage waveform 38 across selected terminals of a semiconductor device which may be plugged into a suitable socket 40, if the semiconductor device is a bipolar transistor, or in the case that the semiconductor device is a diode, it can be connected between contacts 42.

The invention will be described in connection with junction type transistors and diodes. Any resulting currents which flow through the various junctions of a junction type of transistor or through a diode being tested actuates one or more of the amplifiers 44, 46, 48 and 50 which in turn control the test information indicator lamps 52, 54, 56 and 58, respectively. Another indicator lamp 60, which is preferably centrally disposed with respect to the lamps 52, 54, 56 and 58, functions as a test mode indicator lamp. The lamp 60 is controlled by another amplifier 62. A first mode operation of the tester is indicated when the indicator lamp 60 is turned off, i.e. unlighted and a second mode operation is indicated when this lamp is lighted. The circuit includes a function switch 64 which is in the position shown in FIG. 1A for testing bipolar transistors and is moved to its alternative position for testing diodes. In the position of the switch 64 shown, the second mode indication occurs when the output waveform 32 from the multivibrator 22 is at its most negative potential.

For purposes of explanation, it will be assumed that a good NPN transistor is plugged into a test socket 40. In the first mode operation, i.e. when the lamp 60 is turned off, the switches 24 and 28 are conductive and the test waveform voltage 38 is applied through the switch 24 to the base terminals of the sockets 40 and of the transistor in one of these sockets. The collector terminals of such socket and the transistor therein are connected to the amplifiers 44 and 48 through a constantly conducting diode bridge 66 having the same impedance as one of the switches 24, 26, 28 or 30 and the emitter terminals of such socket 40 and transistor therein are connected through the switch 28 and an attenuator 70 to the amplifiers 46 and 50. If the base-collector junction of the NPN transistor is conductive, i.e. not open-circuited, current will flow during positive half cycles of the voltage waveform 38 through this junction and the base-emitter junction of the input NPN transistor 67 of the amplifier 44 to turn on this transistor and also the PNP transistor 72 of this amplifier to cause the lamp 52 to be lighted. Similarly, current will flow during positive voltage half cycles of the waveform 38 through the base-emitter junction of the NPN transistor in a socket 40, through the conducting switch 28 and the base-emitter junction of the NPN input transistor 74 of the amplifier 46 to turn on this transistor and the transistor 76 to light the lamp 54. No current will flow through the base-emitter junctions of the PNP input transistors 78 and 80 of the amplifiers 48 and 50 so that these transistors and the transistors 72 and 84 of these amplifiers will not be turned on to light the lamps 56 and 58. The switches 26 and 30 do not conduct signal currents during the first mode operation.

If either of the base-collector or emitter-base junctions of the NPN transistor being tested are open-circuited during the first mode test, the respective lights 52 and 54 will not be lighted. On the other hand, if the base-collector junction is short-circuited, current will flow during negative half cycles of the voltage waveform 38 through the base-emitter junction of the PNP input transistor 78 of the amplifier 48 so that the lamp 56 will also be lighted as well as the light 52, and if the emitter-base junction is short-circuited, current will flow so that amplifier 50 will cause lighting of the lamp 58. The first mode test operation thus gives full information with respect to whether either or both of the base-collector and emitter-base junctions are operating correctly or are open-circuited or short-circuited. It will be noted that it is the lighting of the lamps 52 and 54 and the failure to light the lamps 56 and 58 which indicates that the transistor being tested is an NPN transistor and that the base-collector and emitter-base junctions are individually in operating condition.

In the second mode test operation, the lamp 60 is lighted and the switches 26 and 30 are conductive while the switches 24 and 28 are non conductive. Under these conditions, the test waveform voltage 38 is applied through the switch 26 to the emitter terminals of the sockets 40 and the transistor in one of such sockets. The switch 30 connects the amplifiers 46 and 50 to the collector terminals of such socket 40 and the transistor therein and the bridge 66 similarly connects the amplifiers 44 and 48 to such collector terminals. If the transistor is a good transistor, whether it be an NPN or PNP transistor, no current will flow between the emitter terminal and the collector terminal of the transistor and none of the lamps will be lighted. If either the base-collector or the emitter-base junction are short-circuited, current will flow in one direction between these terminals. If there is a short circuit directly between the emitter-collector terminals, current will flow in both directions. Thus, if the emitter-collector terminals are directly short-circuited or both the base-collector and emitter-base junctions are short-circuited, all of the lamps 52, 54, 56 and 58 will be lighted in the second mode test. If the transistor under test is an NPN transistor and the emitter-base junction is shorted, current will flow through the base-collector junction and the amplifiers 44 and 46 will cause the lamps 52 and 54 to be lighted during the second mode operation. On the other hand, if it is the base-collector junction which is short-circuited, the amplifiers 48 and 50 will cause the lamps 56 and 58 to be lighted. The indications for a PNP transistor are the inverse of the indications resulting from testing an NPN transistor. For example, a good NPN transistor undergoing test will cause the lamps 52 and 54 to be lighted during first mode operation whereas a good PNP transistor undergoing test will cause the lamps 56 and 58 to be lighted.

The interrogation waveform 38 is produced by clipping the alternating current voltage from the power supply 20 with two zenner diodes 86 and 88 and delivering the clipped waveform to the bases of an NPN transistor 90 and a PNP transistor 92 through an adjustable potentiometer 94. The transistors 90 and 92 have their collectors connected to the positive and negative outputs respectively of the power supply 20 and their emitters connected together and to the switches 24 and 26, the transistors 90 and 92 thus being current amplifiers having low impedance outputs.

In the above description of the circuit, two of the switches 24, 26, 28 and 30 are connected in series with terminals of the transistor under test or one of these switches and the bridge 66 are connected in series with terminals of such transistor. The reason for the bridge 66 is to cause all of the various switching circuits to present the same impedance to the test signal. This impedance in conjunction with the impedance of the attenuators 69 to 70 to ground is sufficiently low to enable transistors to be tested while connected in a utilization circuit and also enable certain power transistors, which would otherwise show excess leakage resulting in a short circuit indication to be tested. Probes connected to the terminals 95, 96 and 98 can be employed to test transistors while connected in such utilization circuits.

It has been found, however, that the amplitude of the test waveform 38 should be reduced during second mode testing of transistors connected in a utilization circuit. This is during the time the lamp 60 is lighted and the test signal is applied between the emitter and collector terminals of the transistor under test. Components of the utilization circuit may permit the transistor under test to turn on or even saturate, if the higher voltage test signal employed during the first mode operation is also employed in the emitter to collector short circuit test of the second mode.

A circuit including diodes 100 and 102 and an adjustable resistor 104 is employed to load the input circuit of the transistors 90 and 92 to reduce the amplitude of the waveform 38 during the second test mode. The diodes 100 and 102 are connected in series with resistors 106 between the outputs of the multivibrator 22 which provide the waveforms 32 and 34 so that current flows through such diodes when the waveform 32 is at its most negative potential and has caused turning on of the lamp 60. This produces a neutral or ground potential point between the diodes which is connected to the input of the potentiometer 94 through the resistor 104 to partly short circuit the potentiometer 94 and thus reduce the amplitude of the input to the transistors 90 and 92 to attenuate the test waveform 38.

Diodes are, however, tested between the contacts 42 and it is desirable to apply the unattenuated waveform 38 across the diodes during testing of such diodes, particularly if they are connected into an utilization circuit. This can be accomplished by moving the switch 64 to its alternative diode test position. This reverses the connections of the diodes 100 and 102 to the outputs of the multivibrator and so that the wave shaper circuit 36 is not loaded by the circuit including these diodes and the waveform 38 is not attenuated during the time the test waveform 38 is being applied in series with the contacts 42 or terminals 95 and 98.

For example, it is possible to test bipolar transistors in circuits in which the impedance across either or both positions are as low as 270 ohms. The open circuit peak to peak voltage of the waveform 38 applied between the base terminals of the transistors and the emitter and collector terminals in the first mode tests by adjusting the potentiometer 94 may, for example be 4.5 volts, and this same open circuit voltage is applied across the terminals of a diode in the diode test. The open circuit peak to peak voltage applied between the collector and emitter terminals of the bipolar transistor in the second mode tests by adjusting the variable resistor 104, may, for example be 2.5 volts. The impedance of the test circuit is, however, such that the current through any junction is limited to 15 to 20 ma.

A good diode undergoing tests by being connected across the contacts 42 or between the terminals 94 and 98, if correctly marked and correctly positioned in accordance with such mark, will cause the lamps 52 and 54 to be lighted when the mode indicator lamp 60 is not lighted, thus providing a first mode indication. If the diode is open-circuited, no lamps 52, 54, 56 or 58 will be lighted in either mode and if the diode is short-circuited, all of the lamps 52, 54, 56 and 58 will be lighted during the first test mode indication only.

A few of the various test patterns for possible conditions of bipolar transistors of the NPN or PNP type and for diodes are shown in FIG. 2. Each rectangle shows the pattern of the five indicator lights during the pattern of the first test mode operation at the top of the rectangle and the pattern of indicator lamps for the second mode operation at the central portion of the rectangle. Each rectangle also contains a brief explanation of the meaning of the indication. In each case, a circle with a cross therein means a lighted lamp. All of the possible test patterns are not illustrated, thus there are 21 commonly encountered test patterns for transistors and 3 for diodes, all of which give information about the condition of the semiconductor and all of which can easily be derived using the above statement of operation. The test patterns for good diodes are the same as the test patterns for good transistors, the test pattern at the right of FIG. 2, however, indicating that the diode has been incorrectly marked or incorrectly connected to the test circuit. The test pattern marked PNP Leaky can occur when the transistor being tested is a good germanium power transistor or the utilization circuit in which the transistor is connected is of unusually low impedance.

The power supply 20 is a conventional full wave type employing rectifier diodes supplied from the secondary 108 of a transformer, which has a center tap connected to the circuit ground. The power supply provides positive and negative full wave rectified pulsating direct current voltages to the amplifiers 44, 46, 48, 50 and 62 and also provides filtered positive and negative DC voltages to the multivibrator 22 and bridge 66 as well as to the transistors 90 and 92 through rectifier diodes 110 and a resistance-capacitance filter circuit 112.

The multivibrator 22 is of the free running or astable type including NPN transistors 114 and 116 and PNP transistors 118 and 120, each connected in circuit across the filtered output of the power supply 20. The multivibrator includes coupling or feedback circuits from the collector of each NPN transistor to the base of the other NPN transistor, each including a capacitor 122 and resistors 124 and 126. The time constant of each of these circuits is such that the multivibrator square wave output voltage has half cycles which are at least a material portion of a second, for example, one-half to 1 second in duration, in order that each of the test modes above described persist for a sufficient time interval that the two modes can be easily distinguished visually. That is to say, the indicator lamps which are lighted in a given test stay on long enough that the results of the test of each of the test modes can be separately recognized. The PNP transistors 118 and 120 are phase reversing transistors which have their bases connected through resistors 128 and 130, respectively, to the collectors of the transistors 116 and 114, respectively, and their collectors connected to the collectors of the transistors 114 and 116, respectively.

The various sockets 40 are for transistors of different sizes or connection arrangements. As stated above, the terminals 95, 96 and 98 are also provided for connecting to transistors not fitting the sockets provided or for testing transistors or diodes without removing them from a circuit in which they have been installed.

In order to enable testing of semiconductor devices, particularly when connected in a utilization circuit, without having to look at the test instrument, an audible signal is produced by the circuit of FOG. 1B when the display of the lamps 52, 54, 56, 58 and 60 conforms to a test pattern shown in the rectangles labeled "-Good" in FIG. 2. No audible signal is produced for any other test pattern.

The terminals marked a, b, c, and d of the amplifiers 46, 50, 44 and 48, respectively, of FIG. 1A are connected to the similarly marked terminals of FIG. 1B, and the positive potential supplies marked +5 in FIG. 1B are connected to the +5 output of a regulated power supply 131 shown in FIG. 1A. The terminals a and c are connected through resistors 132 and 134 to the bases of common emitter-connected NPN input transistors 136 and 138, respectively, of the circuit of FIG. 1B and the terminals b and d are connected through resistors 140 and 142 to the emitters of common base-connected NPN input transistors 144 and 146, respectively. When none of the lamps 52, 54, 56 and 58 are lighted, the terminals a and b are at a negative potential to cut off transistors 136 and 138, and the terminals b and d are at positive potential to cut off transistors 144 and 142.

A pair of integrated circuit elements 148 and 150, both contain two independent jk flipflop circuits, all of which are substantially identical. The transistors 136 and 138 have their collectors connected to pin 1 of the integrated circuit elements 148 and 150, respectively, and the transistors 144 and 146 have their collectors connected to pin 5 of integrated circuit elements 148 and 150, respectively. With the transistors 136, 138, 144 and 146 cut off and the other connections to such integrated circuits those shown in FIG. 1B, including the connection of the collector of a normally cut off common emitter connected NPN reset transistor 152 to the pins 2 and 6 of both integrated circuit elements, the collectors of the transistors 136, 138, 144 and 146 will be at a relative positive or high potential, the Q outputs at pins 9 and 12 of the two integrated circuit elements 148 and 150 will be at a relative negative or low potential and the $\bar{Q}$ outputs at pins 8 and 13 will be at a relative positive or high potential providing that the four flipflop circuits have been reset by a negative pulse from the reset transistor 152 while the collectors of the transistors 136, 138, 144 and 146 are at their high potential.

The circuit of FIG. 1B also contains an integrated circuit element 154 which has four positive logic nand gates 156, 158, 160 and 162. With the connections shown between the integrated circuit elements 148 and 150 and the input pins of the nand gates of the integrated circuit element 156 and with the Q and $\bar{Q}$ outputs of the integrated circuit elements 148 and 150 being that described in the preceding paragraph, the inputs of each such nand gates is low at one input terminal and high at the other terminal so that the outputs of all of these nand gates are high.

The output pins 3, 6, 8 and 11 of the nand gates 156, 158, 160 and 162 are connected to input pins of another integrated circuit element 164 containing 3 negative logic nand gates 166, 168 and 170 and a positive logic nor gate 172. With the high output from the nand gates 156, 158, 160 and 162 just described as inputs, the nand gates 166 and 168 each have two high inputs resulting in a low output which is supplied to the nor gate 172. The result is a high output from pin 10 of the nor gate 172 which is delivered to pin 11 of the negative logic nand gate 170. This gate requires low inputs to both of its input pins 11 and 12 to produce a high output so that the output at pin 13 of gate 170 remains low as long as the input to the pin 11 is high irrespective of whether the input at pin 12 is high or low. The output from the pin 3 of the gate 170 is transmitted through a resistor 174 to the base of a common emitter connected NPN transistor 176 having its collector connected in series with a sound producing device 178. Under the conditions just described with the output of the gate 170 low, the transistor 176 is cut off and no sound is produced by the device 178. This is the normal or quiescent condition of the logic circuit when no semiconductors are connected to the test circuits.

A common emitter connected PNP transistor 179 shown in FIG. 1B has its base connected through a resistor 180 to the terminal e of FIG. 1A and through another resistor 182 to ground. The terminal e is positive during the first test mode when the amber light 60 is not lighted and is negative during the second test mode when the amber light is lighted. When the potential of the terminal e is positive, the transistor 179 is cut off and its collector is a ground potential. When the potential at the terminal e goes negative, the transistor 179 is turned on and its collector goes positive. A timing capacitor 184 is rapidly charged positive through a resistor 186 to drive the input pin 12 of the gate 170 positive which prevents this gate from having a high output until the potential at the terminal e again goes positive to cut off the transistor 179, and the capacitor 184 discharges through a resistor 188 to again provide a low input to pin 12 of the gate 170. The latter happens during the first test mode when the amber light is not lighted but no sound will be produced by the device 178 unless the input at the pin 11 of the gate is low at this time.

The change of the potential on the collector of the transistor 179 from ground potential to a positive potential when the terminal e goes negative causes a positive pulse to be transmitted through a coupling capacitor 189 and a resistor 190 to the base of the transistor 152. This pulse is rapidly dissipated through the resistor 192 so that a short negative clearing pulse is produced and transmitted to the integrated circuit elements 148 and 150 whenever the potential at the terminal e changes from positive to negative at the beginning of a second test mode.

Sound will be produced by the device 178 during the first test mode, if and only if either the two green lamps 52 and 50 or the two red lamps 56 and 58 are lighted during either or both test modes in addition to the lighting of the amber lamp during the second test mode. Thus sound will not be produced if no red or green lamps are lighted or if one only green lamp or one only red lamp is lighted, or if any combination of red and green lamps is lighted. This means that only the test patterns marked "Good" in FIG. 2 will cause the production of sound by the device 178.

If a good NPN transistor is positioned in a test socket 40, the function switch 64 is in the transistor test position shown in FIG. 1A and the amber lamp 60 has just been lighted at the beginning of a second test mode, as a result of the terminal e being driven negative and also if the collector-emitter-circuit is not shorted or leaky, no red or green lights are lighted during the second test mode. It should be noted that during the second test mode there is a positive charge on the capacitor 184 which causes the gate 170 to be disabled to produce a high output so that no sound can be produced during such test mode. Any test signals causing the lighting of any red or green lamps during the second test mode will, however, produce corresponding negative inputs to and a change of state of flipflops of the integrated circuit elements 148 and 150. Such change of state will persist to store these test signals in the jk flip-flops until the next clearing pulse from the transistor 152 due to the beginning of the next second mode test period.

If the individual junctions of the NPN transistor being tested are not shorted and are conductive in the forward direction, the two green lamps 52 and 54 will be lighted during the next first test mode, when the amber lamp is not lighted, and the signals producing this result will also produce positive inputs at the terminals a and c to provide negative inputs at the pins 1 of the integrated circuit elements 148 and 150. The test signals are thus also stored in the jk flipflops. The Q output at the pins 12 of these elements change from low to high and the $\bar{Q}$ outputs from the pins 13 change from high to low. This produces two high inputs to the gates 156 and 160 so that the outputs from these gates change from high to low. It also produces two low inputs to the gates 158 and 162 so that the outputs from these gates remain high. The inputs to the gate 166 are still both high but the inputs to the gate 168 are both low so that the output from this gate becomes high. The resulting high input to the pin 9 of nor gate 172 causes a low output from this gate so that the input to pin 11 of the gate 170 becomes low.

When amber lamp 60 was turned off at the beginning of the first test mode, the potential at the terminal e became positive to turn off the transistor 179 and reduce the charge potential on the timing capacitor 184 to ground potential. The charge on the capacitor dissipates through the resistor 188 so that the input to pin 12 of the gate 170 becomes sufficiently low to produce, in conjunction with the low input at the pin 11 of this gate, a high output from such gate and the production of sound from the device 178. This sound lasts until the end of the first mode test at which time a negative clearing pulse for the fliplops of the elements 148 and 150 is again produced at the collector of the transistor 152. Since under the conditions above described all inputs to the integrated circuit elements 148 and 150 are again high, the input at the pin 11 of the gate 170 again becomes high and the output from this gate becomes low to cause the sound to cease.

The operation above described takes place when a good diode is properly connected into the test circuit and the function switch 64 of FIG. 1A is also moved to its diode test position.

A similar operation occurs during the test of a good PNP transistor or a good diode improperly marked or improperly connected into the test circuit except that it is the two red lamps 56 and 58 which are lighted during the first test mode. If any other lamps are lighted during either mode the input to the pin 11 of the gate 170 will remain high and no sound is produced.

While the tester is not intended to test field effect transistors or such devices as silicon controlled rectifiers, etc., it is possible to make a test to determine the test patterns for a known good device of any of these types and compare the test patterns of other similar devices with that for one known to be good.

I claim:

1. A testing device for polar transistors which comprises:
   first test means for providing separate first mode tests of the conductive properties of the emitter-base junction of said transistor and of the base-collector junction of said transistor;
   second test means for providing a second mode test of the conductive properties of said transistor between the emitter and collector of said transistor;
   control means for causing operation of said test means to produce a series of successive tests in which said first mode tests alternate with said second mode tests;
   and audible signal means for producing an audible signal only when said junctions have forward conductivity and no substantial reverse conductivity during said first mode tests and said transistor has no substantial conductivity in either direction between said emitter and collector during said second mode tests.

2. The testing device of claim 1 in which:
   said test means includes means for applying an alternating test voltage across said junctions to produce test signals when current flows through said junctions in either direction in said first mode tests and for applying an alternating voltage between said emitter and collector to produce similar test signals in said second mode test;
   and said audible means includes means for producing said audible signal when test signals are produced by flow of current in a forward direction through said junctions during said first mode test and no other test signals are produced during said test.

3. The testing device of claim 2 which also includes storage means for storing said test signals from both said tests;
   and said audible means includes logic means for determining when the test signals stored in said storage means are those produced by current flow in a forward direction during said first mode test and do not include any other test signals;
   and means for delaying the production of said audible means until after any test signals produced in either of said test modes are stored in said storage means.

4. The testing device of claim 2 in which;
   said audible means also includes means for producing said audible signal when said test signals produced during said first test mode are produced by current flow in a forward direction through the junctions of either a PNP or an NPN transistor.

5. The testing device of claim 2 in which;
   said second test means includes means for applying an alternating test voltage between said emitter and said collector of lower peak to peak value than the alternating test voltage applied across said junction by said first test means.

6. The testing device of claim 2 which also includes;
   diode testing means for testing diodes including means for producing test signals when the diode being tested has forward conductivity and is not short-circuited which are the same as the test signals produced by flow of current in a forward direction through said junctions of a transistor being tested by said first test means so as to cause production of said audible signal by said audible signal means.

7. The testing device of claim 2 in which;
   said first test means includes means for producing a first pair of test signals when current flows in a forward direction through the junctions of a PNP transistor and a different pair of test signals when current flows in a forward direction through the junctions of an NPN transistor;
   and said audible means includes means for producing said audible signal when either of said pairs of test signals are produced by said first test means and no other test signals are produced by either of said test means.

8. The testing device of claim 7 which also includes;
   diode testing means for testing diodes including means for producing test signals which are the same as one of said pairs of test signals and no other test signals when said diode is conducting in a forward direction and not short-circuited.

9. The testing device of claim 8 which also includes;

function switching means for enabling said testing device to test said diodes when said function switch is in one position and enabling said testing device to test said transistors when said function switch is in another position.

* * * * *